(12) United States Patent
Yokote et al.

(10) Patent No.: US 12,423,701 B2
(45) Date of Patent: Sep. 23, 2025

(54) TRANSACTION PROCESSING SYSTEM AND TRANSACTION PROCESSING METHOD

(71) Applicant: Toshiba Tec Kabushiki Kaisha, Tokyo (JP)

(72) Inventors: Satoshi Yokote, Ome Tokyo (JP); Hirokazu Tani, Matsudo Chiba (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 101 days.

(21) Appl. No.: 18/348,076

(22) Filed: Jul. 6, 2023

(65) Prior Publication Data

US 2023/0351389 A1 Nov. 2, 2023

Related U.S. Application Data

(63) Continuation of application No. 17/228,628, filed on Apr. 12, 2021, now abandoned.

(30) Foreign Application Priority Data

Sep. 4, 2020 (JP) .................................. 2020-149092

(51) Int. Cl.
*G06Q 20/40* (2012.01)
*G06Q 20/04* (2012.01)
*G06Q 30/0234* (2023.01)

(52) U.S. Cl.
CPC ..... *G06Q 20/40145* (2013.01); *G06Q 20/047* (2020.05); *G06Q 30/0234* (2013.01)

(58) Field of Classification Search
None
See application file for complete search history.

(56) References Cited

U.S. PATENT DOCUMENTS

| 2007/0288320 | A1 | 12/2007 | Cooper et al. |
| 2008/0313066 | A1 | 12/2008 | Sholtis et al. |
| 2014/0032297 | A1 | 1/2014 | Germann et al. |
| 2014/0337150 | A1* | 11/2014 | Anand ................. G06Q 20/045 705/16 |
| 2016/0328717 | A1 | 11/2016 | Shaw et al. |
| 2019/0318361 | A1* | 10/2019 | Hurst ............... G06Q 20/40145 |
| 2020/0193444 | A1* | 6/2020 | Mogari ............... G06F 16/2455 |
| 2022/0058594 | A1 | 2/2022 | Hasegawa |

FOREIGN PATENT DOCUMENTS

| JP | 2015-072674 A | 4/2015 |
| JP | 5739046 B2 | 6/2015 |
| JP | 2016-136361 A | 7/2016 |
| JP | 2018-060278 A | 4/2018 |
| JP | 2020-095587 A | 6/2020 |
| WO | 2020/137142 A1 | 7/2020 |

OTHER PUBLICATIONS

Notice of Reasons for Refusal mailed Mar. 26, 2024 in corresponding Japanese Patent Application No. 2020-149092, 8 pages (with Translation).

\* cited by examiner

*Primary Examiner* — Matthew S Gart
*Assistant Examiner* — Irene S Kang
(74) *Attorney, Agent, or Firm* — Kim & Stewart LLP

(57) ABSTRACT

In accordance with an embodiment, a transaction processing system includes a user terminal, an authentication server, a payment server, and a receipt server. The receipt server manages receipt information regarding a transaction paid for by the payment server in association with a user's identifier acquired by the authentication server on the basis of biometric data input by the user terminal.

5 Claims, 22 Drawing Sheets

TRANSACTION PROCESSING SYSTEM AND TRANSACTION PROCESSING METHOD

CROSS-REFERENCE TO RELATED APPLICATION

This application is a continuation of U.S. patent application Ser. No. 17/228,628, filed on Apr. 12, 2021, which is based upon and claims the benefit of priority from the prior Japanese Patent Application No. 2020-149092, filed on Sep. 4, 2020, the entire contents of each of which are incorporated herein by reference.

FIELD

An embodiment described here generally relates to a transaction processing system and a transaction processing method.

BACKGROUND

In a case where biometric authentication is performed for authentication of a payer of a transaction in a conventional transaction processing system, the payer needs to perform an operation for inputting his/her own biometric data. Moreover, in connection with such a transaction, a payer who wishes to apply an electronic receipt service needs to perform an operation of displaying a barcode indicating an identifier of a user of the electronic receipt service on an information terminal such as a smartphone and reading the barcode, for example. Therefore, in the conventional transaction processing system, the payer's operations are troublesome. In view of such circumstances, in a case where biometric authentication is used for authenticating the payer of the transaction who uses the electronic receipt service, it is desirable to reduce the time and effort of the payer.

DETAILED DESCRIPTION

In accordance with one embodiment, a transaction processing system provides a transaction processing service to a user. The transaction processing system includes a user terminal, an authentication server, a payment server, and a receipt server. The user terminal inputs biometric data of a user who performs payment of a transaction as a target of the transaction processing service. The authentication server authenticates the biometric data input by the user terminal, and acquires an identifier for identifying the user who performs the payment in a case where the authentication has succeeded, the identifier being associated with the biometric data. The payment server acquires payment data associated with the identifier acquired by the authentication server and pays for the transaction by using the acquired payment data. The receipt server manages receipt information regarding the transaction paid for by the payment server in association with the identifier acquired by the authentication server.

Hereinafter, an embodiment will be described with reference to the drawings. It should be noted that the same reference signs in the figures will denote the same or similar portions.

First Embodiment

Figure 1:
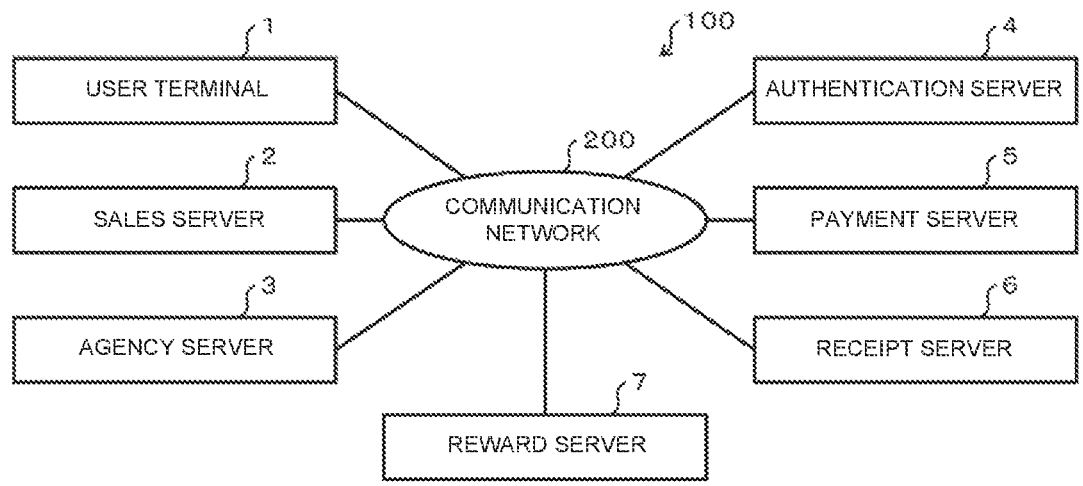
FIG. 1 is a block diagram showing a configuration of a transaction processing system according to an embodiment.

FIG. 1 is a block diagram showing a configuration of a transaction processing system 100 according to a first embodiment. The transaction processing system 100 includes a user terminal 1, a sales server 2, an agency server 3, an authentication server 4, a payment server 5, a receipt server 6, and a reward server 7. The user terminal 1, the sales server 2, the agency server 3, the authentication server 4, the payment server 5, the receipt server 6, and the reward server 7 can communicate with one another via a communication network 200. As the communication network 200, the Internet, a virtual private network (VPN), a local area network (LAN), a public communication network, a mobile communication network, a dedicated line, and/or the like can be used alone or in any combination as appropriate. It should be noted that although the transaction processing system 100 includes a plurality of user terminals 1 and a plurality of payment servers 5, only the user terminal 1 and the payment server 5 are shown in FIG. 1. Moreover, the transaction processing system 100 can include a plurality of sales servers 2. Moreover, the transaction processing system 100 can include a plurality of reward servers 7.

The user terminal 1 is an information terminal used by a user who is a payer of a transaction to be processed in the transaction processing system 100. The user terminal 1 is typically dedicatedly used by an individual user. It should be noted that although it can be any transaction as long as it involves payment of a price, the transaction to be processed in the transaction processing system 100 is a commodity sale in this embodiment.

The sales server 2 is a server device that performs information processing for sales, such as registration of sold commodities and calculation of the price of the sold commodities. The sales server 2 is, for example, a point-of-sale (POS) server. The sales server 2 is managed by, for example, a merchandise seller or the like.

The agency server 3 is a server device that performs information processing for providing a payment agency service that enables a plurality of payment services provided by the plurality of payment servers 5 to be easily used. The agency server 3 is managed by, for example, a provider of the payment agency service.

The authentication server 4 is a server device that performs information processing for authenticating whether or not the payer has been registered as a user of a transaction processing service provided by the transaction processing system 100. The authentication server 4 is managed by, for example, a provider of an authentication service.

The payment server 5 is a server device that performs information processing for payment in response to a request from the agency server 3. The plurality of payment servers 5 included in the transaction processing system 100 includes payment servers using different payment methods to be applied. For example, one of the payment servers 5 performs credit payment. For example, another one of the payment servers 5 performs code payment. Moreover, the plurality of payment servers 5 included in the transaction processing system 100 includes payment servers using the same payment method to be applied but different suppliers, brands, and the like. For example, two of the payment servers 5 perform credit payment for credit cards of different brands. The agency server 3 is managed by, for example, the provider of the payment agency service. The payment server 5 is managed by, for example, a provider of a payment service.

The receipt server 6 is a server device that performs information processing for providing an electronic receipt service to a user who has already been registered for use. The receipt server 6 is managed by, for example, a provider of the electronic receipt service.

The reward server 7 is a server device that performs information processing for providing a reward giving service to the user who has already been registered for use. The reward giving service is a service that gives an arbitrary reward to the user. In this embodiment, the reward giving service is a point service. The reward server 7 is managed by, for example, a provider of the reward giving service. It should be noted that the merchandise seller and the providers of the various services are typically different from each other. However, some or all of the merchandise sellers and the providers of the various services may be the same suppliers, etc.

Figure 2:
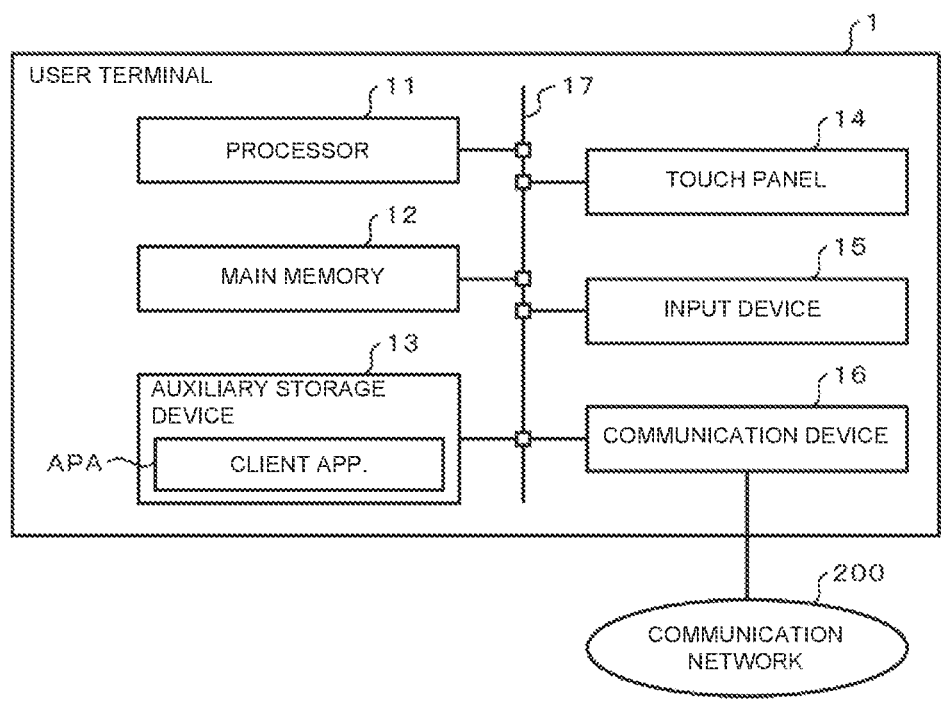
FIG. 2 is a block diagram showing a circuit configuration of a user terminal of the transaction processing system according to the embodiment.

FIG. 2 is a block diagram showing a circuit configuration of the user terminal 1. The user terminal 1 is typically a portable information processing apparatus such as a smartphone, a mobile phone, a tablet terminal, or the like.

The user terminal 1 includes a processor 11, a main memory 12, an auxiliary storage device 13, a touch panel 14, an input device 15, a communication device 16, a transmission line 17, and the like. The processor 11, the main memory 12, the auxiliary storage device 13, the touch panel 14, the input device 15, and the communication device 16 can communicate with one another via the transmission line 17. By connecting the processor 11, the main memory 12, and the auxiliary storage device 13 through the transmission line 17, a computer that performs information processing for controlling the user terminal 1 is configured.

The processor 11 corresponds to a central portion of the computer. The processor 11 controls each unit to realize various functions as the user terminal 1 in accordance with an information processing program such as an operating system and an application program. The processor 11 is, for example, a central processing unit (CPU).

The main memory 12 corresponds to a main storage portion of the computer. The main memory 12 includes a non-volatile memory area and a volatile memory area. The main memory 12 stores the operating system and the application program in the non-volatile memory area. Moreover, the main memory 12 sometimes stores data necessary for the processor 11 to perform the processing for controlling each unit in the non-volatile or volatile memory area. The volatile memory area of the main memory 12 is used as a work area in which data is rewritten by the processor 11 as appropriate. The non-volatile memory area is, for example, a read only memory (ROM). The volatile memory area is, for example, a random access memory (RAM).

The auxiliary storage device 13 corresponds to an auxiliary storage portion of the computer. The auxiliary storage device 13 is, for example, an electric erasable programmable read-only memory (EEPROM). A hard disc drive (HDD), a solid state drive (SSD), or various other known storage devices may be used as the auxiliary storage device 13. The auxiliary storage device 13 stores data used by the processor 11 to perform various types of processing and data generated by processing at the processor 11. The auxiliary storage device 13 stores the application program.

One of the application programs stored in the auxiliary storage device 13 is an information processing program (hereinafter, referred to as client app) APA for using the transaction processing service provided by the transaction processing system 100. It should be noted that the client app APA is typically downloaded via the Internet and written in the auxiliary storage device 13 in accordance with an operation performed by the user of the user terminal 1. That is, the transfer of the user terminal 1 to the user of the user terminal 1 is performed in a state in which the client app APA is not stored in the auxiliary storage device 13. However, the user terminal 1 in a state in which the client app APA is stored in the auxiliary storage device 13 may be transferred to the user of the user terminal 1.

The touch panel 14 functions as an input device and a display device of the user terminal 1. The input device 15 inputs biometric data. The biometric data is information indicating a feature such as a fingerprint, veins, an iris, and a face. For example, information similar to information used in a well-known biometric authentication technology can be used as the biometric data. In a case where the feature of the fingerprint, for example, is used as the biometric data, an existing fingerprint sensor, for example, can be used as the input device 15. Moreover, in a case where the feature of the face is used as the biometric data, an existing camera, for example, can be used as the input device 15.

The communication device 16 performs communication processing for data communication via the communication network 200. A well-known communication device for performing data communication via the mobile communication network or the Internet, for example, can be used as the communication device 16. The transmission line 17 includes an address bus, a data bus, a control signal line, and the like and sends data and control signals exchanged between the respective connected units.

Figure 3:
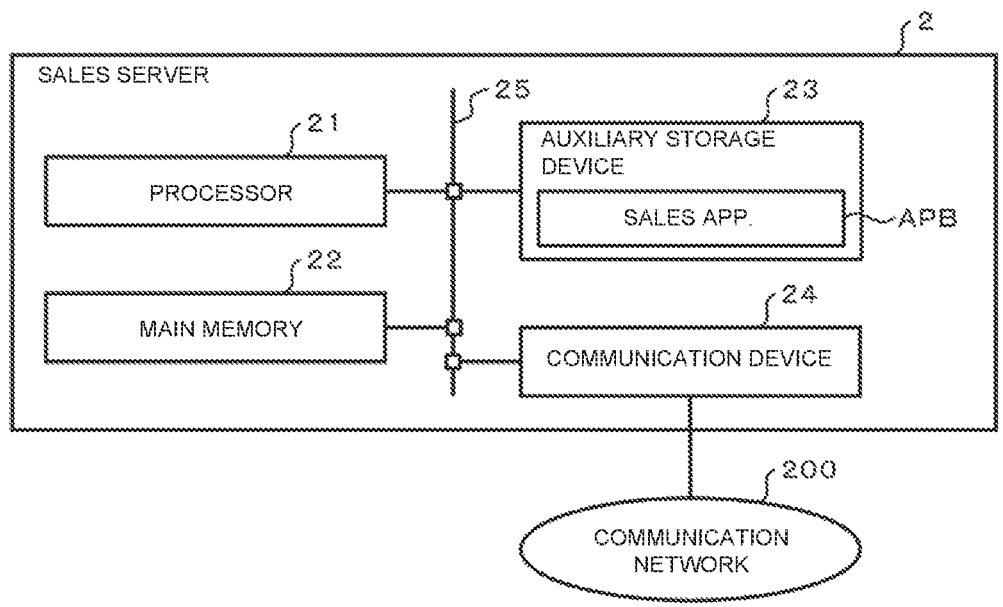
FIG. 3 is a block diagram showing a circuit configuration of a sales server of the transaction processing system according to the embodiment.

FIG. 3 is a block diagram showing a circuit configuration of the sales server 2. The sales server 2 includes a processor 21, a main memory 22, an auxiliary storage device 23, a communication device 24, and a transmission line 25. The processor 21, the main memory 22, the auxiliary storage device 23, and the communication device 24 can communicate with one another via the transmission line 25. By connecting the processor 21, the main memory 22, and the auxiliary storage device 23 via the transmission line 25, a computer for controlling the sales server 2 is configured.

The processor 21 corresponds to a central portion of the computer. The processor 21 performs information processing for realizing various functions as the sales server 2 in accordance with an information processing program such as an operating system and an application program. The processor 21 is, for example, a CPU.

The main memory 22 corresponds to a main storage portion of the computer. The main memory 22 includes a non-volatile memory area and a volatile memory area. The main memory 22 stores the information processing program in the non-volatile memory area. The main memory 22 sometimes stores data necessary for the processor 21 to perform information processing in the non-volatile or volatile memory area. The volatile memory area of the main memory 22 is used as a work area in which data is rewritten by the processor 21 as appropriate. The non-volatile memory area is, for example, a ROM. The volatile memory area is, for example, a RAM.

The auxiliary storage device 23 corresponds to an auxiliary storage portion of the computer. A well-known storage device such as an EEPROM, an HDD, and an SSD can be used as the auxiliary storage device 23. The auxiliary storage device 23 stores data used by the processor 21 to perform various types of processing, data generated by processing at the processor 21, and the like. The auxiliary storage device 23 sometimes stores the information processing program.

The communication device 24 performs communication processing for data communication via the communication network 200. A well-known communication device for performing data communication via the mobile communication network or the Internet, for example, can be used as the communication device 24. The transmission line 25 includes an address bus, a data bus, a control signal line, and the like and sends data and control signals exchanged between the respective connected units.

The auxiliary storage device 23 stores a sales app APB which is one of the information processing programs. The sales app APB is an application program and describes information processing for realizing the functions as the sales server 2.

Figure 4:
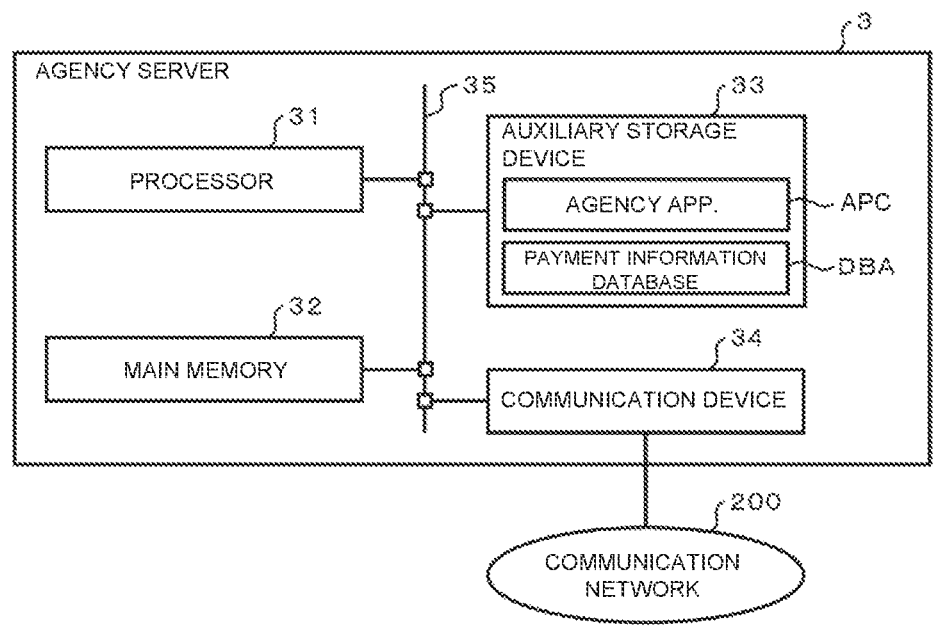
FIG. 4 is a block diagram showing a circuit configuration of an agency server of the transaction processing system according to the embodiment.

FIG. 4 is a block diagram showing a circuit configuration of the agency server 3. The agency server 3 includes a processor 31, a main memory 32, an auxiliary storage device 33, a communication device 34, and a transmission line 35. The processor 31, the main memory 32, the auxiliary storage device 33, and the communication device 34 can communicate with one another via the transmission line 35. By connecting the processor 31, the main memory 32, and the auxiliary storage device 33 via the transmission line 35, a computer for controlling the agency server 3 is configured. It should be noted that schematic functions of the processor 31, the main memory 32, the auxiliary storage device 33, the communication device 34, and the transmission line 35 are the same as the processor 21, the main memory 22, the auxiliary storage device 23, the communication device 24, and the transmission line 25, and thus descriptions thereof will be omitted.

It should be noted that the auxiliary storage device 33 stores an agency app APC instead of the sales app APB. The agency app APC is an application program and describes information processing for realizing the functions as the agency server 3. Moreover, a portion of the storage area of the auxiliary storage device 33 is used as a payment information database DBA.

Figure 5:
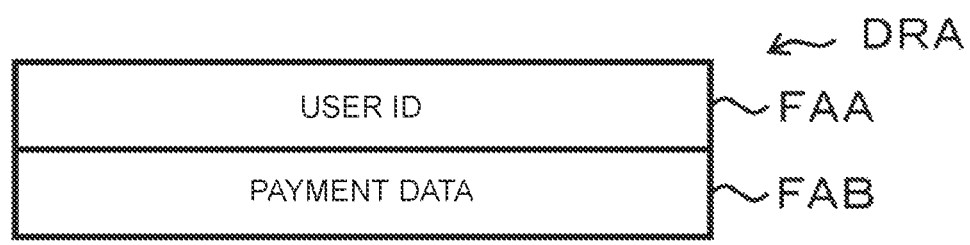
FIG. 5 is a diagram schematically showing a data record configuration included in a payment information database of the agency server according to the embodiment.

FIG. 5 is a diagram schematically showing a configuration of a data record DRA included in the payment information database DBA. The payment information database DBA is a set of data records DRA associated with the user of the transaction processing service. The data record DRA includes fields FAA and FAB. A user identifier (ID), which is the user's identifier, is set in the field FAA. Payment data reported in advance by the user is set in the field FAB. The payment data is information for using the payment service provided by the payment server 5. The payment data is various types of data such as a credit number, for example, which is predetermined for using credit payment, electronic money payment, or various other payment services such as code payment. It should be noted that the data record DRA may include another field and arbitrary information may be set in the field.

Figure 6:
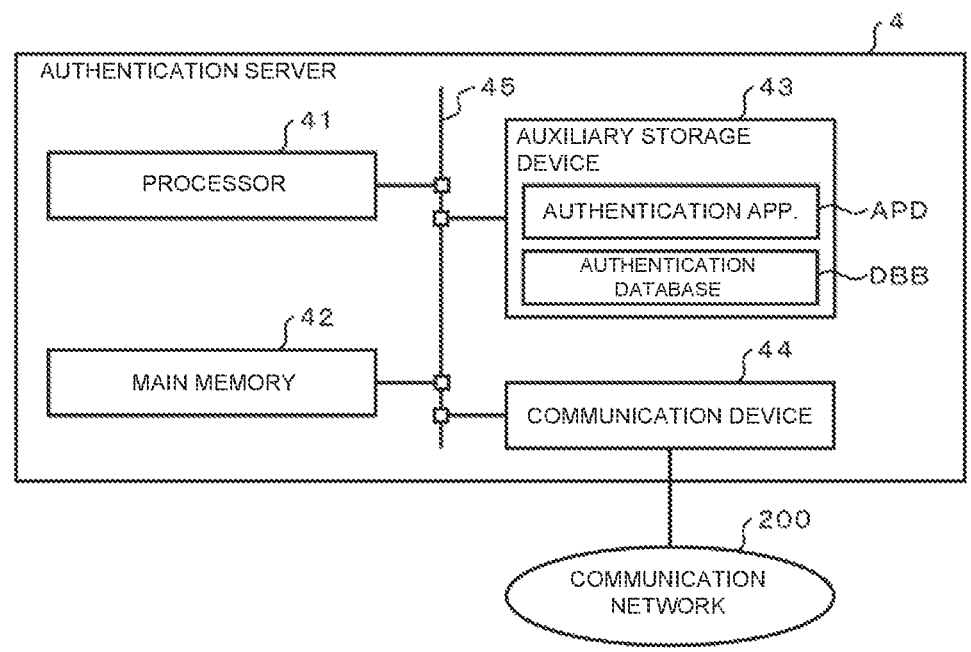
FIG. 6 is a block diagram showing a circuit configuration of an authentication server of the transaction processing system according to the embodiment.

FIG. 6 is a block diagram showing a circuit configuration of the authentication server 4. The authentication server 4 includes a processor 41, a main memory 42, an auxiliary storage device 43, a communication device 44, and a transmission line 45. The processor 41, the main memory 42, the auxiliary storage device 43, and the communication device 44 can communicate with one another via the transmission line 45. By connecting the processor 41, the main memory 42, and the auxiliary storage device 43 via the transmission line 45, a computer for controlling the authentication server 4 is configured. It should be noted that schematic functions of the processor 41, the main memory 42, the auxiliary storage device 43, the communication device 44, and the transmission line 45 are the same as the processor 21, the main memory 22, the auxiliary storage device 23, the communication device 24, and the transmission line 25, and thus descriptions thereof will be omitted.

It should be noted that the auxiliary storage device 43 stores an authentication app APD instead of the sales app APB. The authentication app APD is an application program and describes information processing for realizing the functions as the authentication server 4. Moreover, a portion of the storage area of the auxiliary storage device 43 is used as an authentication database DBB.

Figure 7:
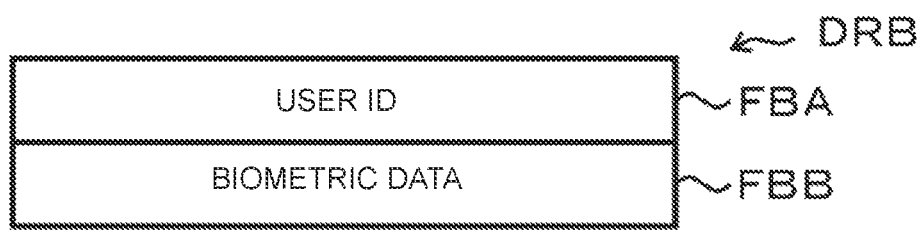
FIG. 7 is a diagram schematically showing a configuration of a data record included in an authentication database of the authentication server according to the embodiment.

FIG. 7 is a diagram schematically showing a configuration of a data record DRB included in the authentication database DBB. The authentication database DBB is a set of data records DRB associated with the user of the transaction processing service. The data record DRB includes fields FBA and FBB. A user ID is set in the field FBA. The biometric data of the user is set in the field FBB. The biometric data is set in the field FBB as a hash value, for example. It should be noted that the data record DRB may include another field and arbitrary information may be set in the field.

Figure 8:
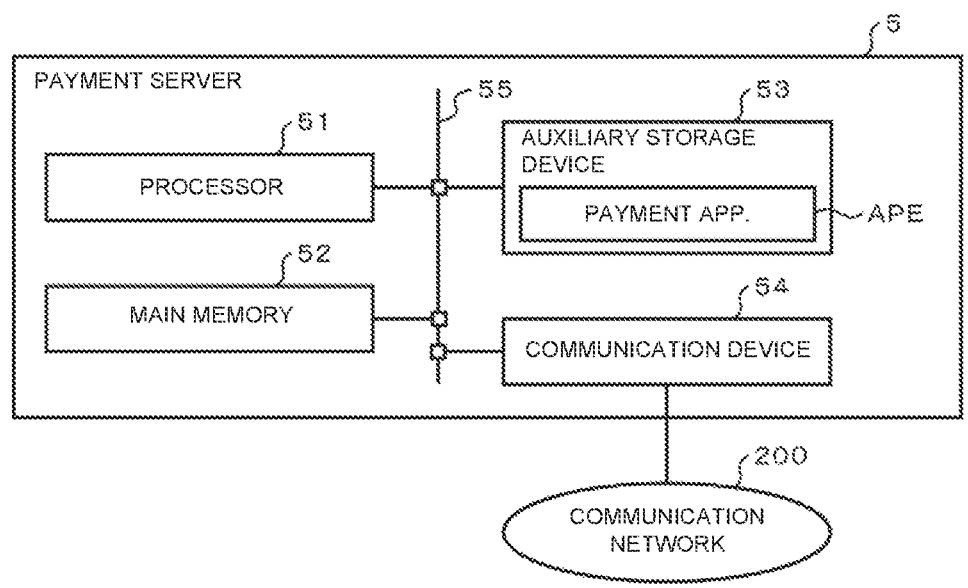
FIG. 8 is a block diagram showing a circuit configuration of a payment server of the transaction processing system according to the embodiment.

FIG. 8 is a block diagram showing a circuit configuration of the payment server 5. The payment server 5 includes a processor 51, a main memory 52, an auxiliary storage device 53, a communication device 54, and a transmission line 55. The processor 51, the main memory 52, the auxiliary storage device 53, and the communication device 54 can communicate with one another via the transmission line 55. By connecting the processor 51, the main memory 52, and the auxiliary storage device 53 via the transmission line 55, a computer for controlling the authentication server 4 is configured. It should be noted that schematic functions of the processor 51, the main memory 52, the auxiliary storage device 53, the communication device 54, and the transmission line 55 are the same as the processor 21, the main memory 22, the auxiliary storage device 23, the communication device 24, and the transmission line 25, and thus descriptions thereof will be omitted.

It should be noted that the auxiliary storage device 53 stores a payment app APE instead of the sales app APB. The payment app APE is an application program and describes information processing for realizing the functions as the payment server 5.

Figure 9:
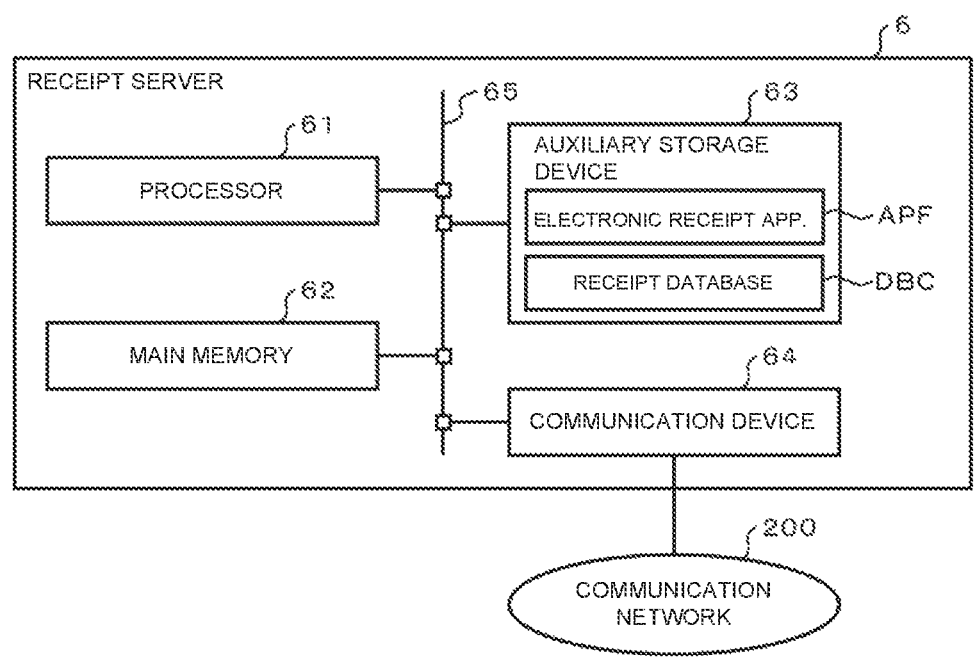
FIG. 9 is a block diagram showing a circuit configuration of a receipt server of the transaction processing system according to the embodiment.

FIG. 9 is a block diagram showing a circuit configuration of the receipt server 6. The receipt server 6 includes a processor 61, a main memory 62, an auxiliary storage device 63, a communication device 64, and a transmission line 65. The processor 61, the main memory 62, the auxiliary storage device 63, and the communication device 64 can communicate with one another via the transmission line 65. By connecting the processor 61, the main memory 62, and the auxiliary storage device 63 via the transmission line 65, a computer for controlling the receipt server 6 is configured. It should be noted that schematic functions of the processor 61, the main memory 62, the auxiliary storage device 63, the communication device 64, and the transmission line 65 are the same as the processor 21, the main memory 22, the auxiliary storage device 23, the communication device 24, and the transmission line 25, and thus descriptions thereof will be omitted.

It should be noted that the auxiliary storage device 63 stores an electronic receipt app APF instead of the sales app APB. The electronic receipt app APF is an application program and describes information processing for realizing the functions as the receipt server 6. Moreover, a portion of the storage area of the auxiliary storage device 63 is used as a receipt database DBC.

Figure 10:
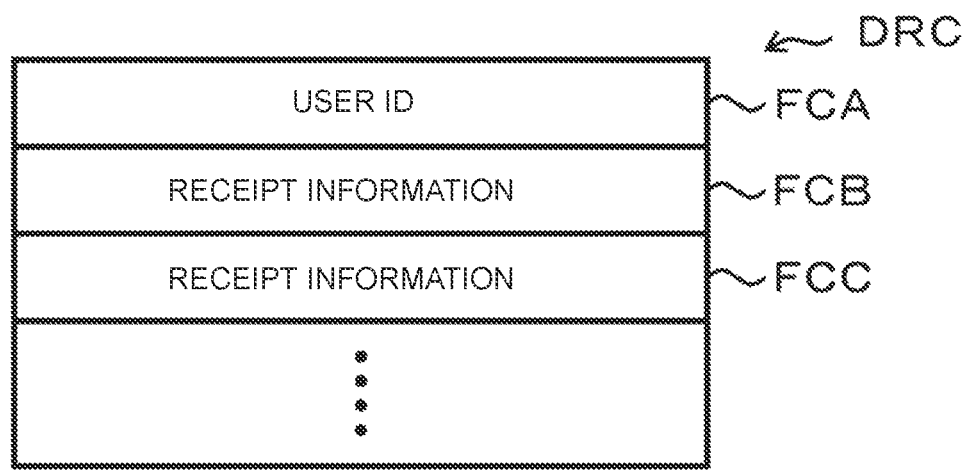
FIG. 10 is a diagram schematically showing a configuration of a data record included in a receipt database of the receipt server according to the embodiment.

FIG. 10 is a diagram schematically showing a configuration of a data record DRC included in the receipt database DBC. The receipt database DBC is a set of data records DRC associated with the user of the transaction processing service. The data record DRC includes fields FCA and FCB. Moreover, the data record DRC can include fields after the field FCC. A user ID is set in the field FCA. Receipt information regarding one transaction is set in the field FCB. In a case where a plurality of pieces of receipt information has been registered, related to the user identified by the user ID set in the field FCA, the receipt information for the second and subsequent transactions is set in each field after the field FCC. It should be noted that the data record DRC may include another field and arbitrary information may be set in the field.

Figure 11:
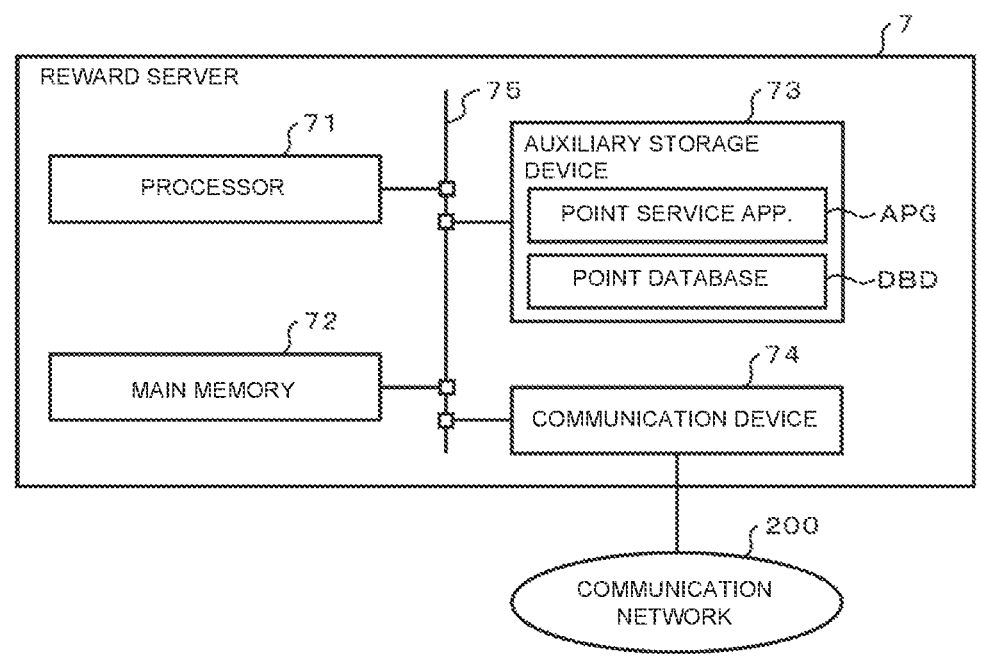
FIG. 11 is a block diagram showing a circuit configuration of a reward server of the transaction processing system according to the embodiment.

FIG. 11 is a block diagram showing a circuit configuration of the reward server 7. The reward server 7 includes a processor 71, a main memory 72, an auxiliary storage device 73, a communication device 74, and a transmission line 75. The processor 71, the main memory 72, the auxiliary storage device 73, and the communication device 74 can communicate with one another via the transmission line 75. By connecting the processor 71, the main memory 72, and the auxiliary storage device 73 via the transmission line 75, a computer for controlling the reward server 7 is configured. It should be noted that schematic functions of the processor 71, the main memory 72, the auxiliary storage device 73, the communication device 74, and the transmission line 75 are the same as the processor 21, the main memory 22, the auxiliary storage device 23, the communication device 24, and the transmission line 25, and thus descriptions thereof will be omitted.

It should be noted that the auxiliary storage device 73 stores a point service app APG instead of the sales app APB. The point service app APG is an application program and describes information processing for realizing the functions as the reward server 7. Moreover, a portion of the storage area of the auxiliary storage device 73 is used as a point database DBD.

Figure 12:
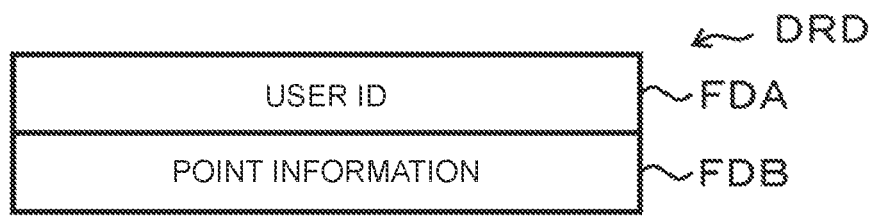
FIG. 12 is a diagram schematically showing a configuration of a data record included in the points database of the reward server according to the embodiment.

FIG. 12 is a diagram schematically showing a configuration of a data record DRD included in the point database DBD. A point database DBD is a set of data records DRD associated with the user of the transaction processing service. The data record DRD includes fields FDA and FDB. A user ID is set in the field FDA. Point information regarding the user is set in the field FDB. Although what kind of information the point information includes is arbitrary, it is assumed that the point information includes points held in the current state, for example. The point information may include history information representing a point giving and using history. It should be noted that the data record DRD may include another field and arbitrary information may be set in the field.

For example, a general-purpose server device can be used as hardware of the sales server 2, the agency server 3, the authentication server 4, the payment server 5, the receipt server 6, and the reward server 7. The transfer of the sales server 2, the agency server 3, the authentication server 4, the payment server 5, the receipt server 6, or the reward server 7 is generally performed in a state in which the sales app APB, the agency app APC, the authentication app APD, the payment app APE, the electronic receipt app APF, or the point service app APG is respectively stored in the auxiliary storage devices 13, 23, 33, 43, 53, 63, or 73 and the payment information database DBA, the authentication database DBB, the receipt database DBC, or the point database DBD is not stored. However, hardware in a state in which the sales app APB, the agency app APC, the authentication app APD, the payment app APE, the electronic receipt app APF, or the point service app APG is not stored in the auxiliary storage device 13, 23, 33, 43, 53, 63, or 73 or hardware in a state in which an application program of the same type in a different version is stored in the auxiliary storage device 13, 23, 33, 43, 53, 63, or 73, and the sales app APB, the agency app APC, the authentication app APD, the payment app APE, the electronic receipt app APF, or the point service app APG may be individually transferred. The sales server 2, the agency server 3, the authentication server 4, the payment server 5, the receipt server 6, and the reward server 7 may be configured by writing the sales app APB, the agency app APC, the authentication app APD, the payment app APE, the electronic receipt app APF, or the point service app APG in the auxiliary storage device 13, 23, 33, 43, 53, 63, or 73 in accordance with an arbitrary operation of an operator. The transfer of the sales app APB, the agency app APC, the authentication app APD, the payment app APE, the electronic receipt app APF, or the point service app APG can be performed by recording it on a removable recording medium like a magnetic disk, a magneto-optical disc, an optical disc, a semiconductor memory, or the like or by communication via a network. The payment information database DBA, the authentication database DBB, the receipt database DBC, or the point database DBD is configured in the auxiliary storage device 33, 43, 63, or 73 in such a manner that the processor 31, 41, 61, or 71 performs information processing.

Next, an operation of the transaction processing system 100 configured as described above will be described. It should be noted that the details of various processes to be described below are only an example, and it is, for example, possible to change the order of some of the processes, omit some of the processes, or add another process as appropriate. In the following description, in order to describe characteristic operations of this embodiment in an easy-to-understand manner, some processes associated with such characteristic operations will be described and descriptions of other processes will be omitted.

It should be noted that in the user terminal 1, the sales server 2, the agency server 3, the authentication server 4, the payment server 5, the receipt server 6, and the reward server 7, the processors 11, 21, 31, 41, 51, 61, and 71 perform information processing for realizing sequences to be described below on the basis of the client app APA, the sales app APB, the agency app APC, the authentication app APD, the payment app APE, the electronic receipt app APF, and the point service app APG.

Figure 13:
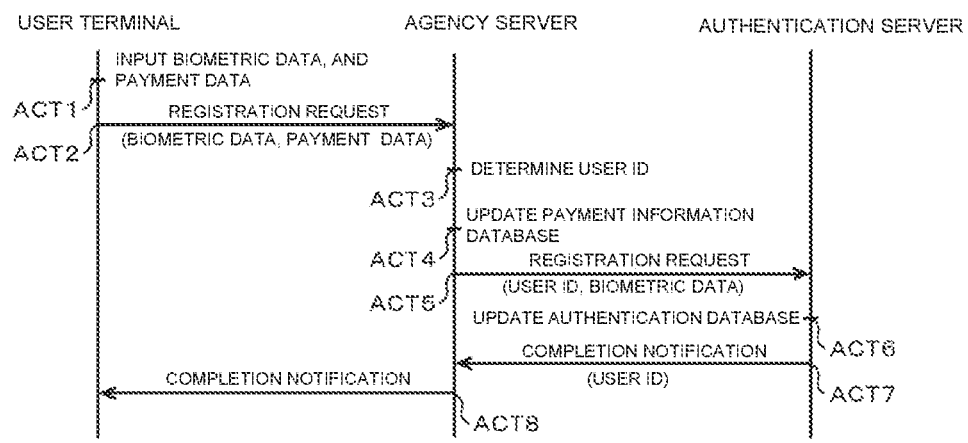
FIG. 13 is a diagram showing a sequence related to user registration of a transaction processing service according to the embodiment.

FIG. 13 is a diagram showing a sequence related to user registration of the transaction processing service. In order to use the transaction processing service, the user installs the client app APA on the user terminal 1, and then instructs to start the information processing based on the client app APA. Moreover, the user instructs the user registration in the user terminal 1. It should be noted that various instructions made by the user in the user terminal 1 are performed by, for example, a predetermined operation on the touch panel 14. In response to the start instruction made by the user, the processor 11 of the user terminal 1 starts the information processing based on the client app APA.

In ACT1 of FIG. 13, the processor 11 inputs biometric data and payment data. The processor 11 guides the user to input biometric data and payment data, for example. The user performs a task for inputting his/her own biometric data into the input device 15 in accordance with the guide. In a case where the feature of the fingerprint is used as the biometric data, for example, the user puts his/her fingertip on the input device 15. In a case where the feature of the face is used as the biometric data, the user directs his/her face to the input device 15. The input device 15 extracts a predetermined feature in terms of the fingerprint, the face, or the like and generates biometric data indicating the predetermined feature. It should be noted that the biometric data may be generated by the processor 11. In accordance with the guide, the user inputs payment data used for payment using the transaction processing service by, for example, a predetermined operation on the touch panel 14. It should be noted that the order of inputting the biometric data and the payment data is arbitrary.

Next, in ACT2, the processor 11 requests the agency server 3 to perform registration. For example, the processor 11 sends request data including identification information for identifying the user registration request and the biometric data and payment data input in ACT1 to the communication network 200 from the communication device 16, the request data being addressed to the agency server 3.

When the request data is sent to the agency server 3 via the communication network 200 and received by the communication device 34 of the agency server 3, the processor 31 of the agency server 3 performs a process of ACT3. It should be noted that various requests to be described below are realized by sending and receiving request data including identification information for identifying the purpose of the request via the communication network 200 in a manner similar to that described above.

In ACT3 of FIG. 13, the processor 31 of the agency server 3 determines the user ID associated with the user such that the user ID is not coincident with a user ID already associated with another user. For example, the processor 31 uses a character string determined in accordance with a predetermined algorithm as the user ID such that the character string can be determined with no duplicates. Alternatively, the processor 31 stores, for example, list data indicating a list of user IDs determined in the past in the auxiliary storage device 33 and determines a user ID not included in the list as a new user ID. The processor 31 may determine the user ID by any other method.

Next, in ACT4, the processor 31 updates the payment information database DBA. For example, the processor 31 adds a new data record DRA in which the user ID determined in ACT3 and the payment data included in the request data have been set in the fields FAA and FAB, respectively, to the payment information database DBA.

Next, in ACT5, the processor 31 requests the authentication server 4 to perform registration. For example, the processor 31 includes, in request data for the request here, the user ID determined in ACT3 and the biometric data included in the request data sent from the user terminal 1 in ACT2.

When the processor 41 of the authentication server 4 receives the registration request, the processor 41 of the authentication server 4 performs a process of ACT6. In ACT6, the processor 41 updates the authentication database DBB. For example, the processor 41 adds a new data record DRB in which the user ID and the biometric data included in the request data have been set in the fields FBA and FBB, respectively, to the authentication database DBB.

Next, in ACT7, the processor 41 notifies the agency server 3 of the registration completion. For example, the processor 41 sends notification data including identification information for identifying the registration completion notification and the user ID set in the field FBA of the new data record DRB to the communication network 200 from the communication device 44 of the authentication server 4, the identification information being addressed to the agency server 3. It should be noted that in a case where it is possible to determine to which registration request the registration completion notification corresponds by using a session ID or an ID for identifying an individual registration request, the user ID does not need to be included in the notification data.

When the notification data is sent to the agency server 3 by the communication network 200 and received by the communication device 34 of the agency server 3, the processor 31 of the agency server 3 performs a process of ACT8. At this time, the processor 31 checks whether or not the user ID included in the notification data matches the user ID determined in ACT3. The processor 31 of the agency server 3 may perform the process of ACT8 only in a case where the user ID included in the notification data matches the user ID determined in ACT3. It should be noted that various notifications to be described below are realized by sending and receiving notification data including identification information for identifying the purpose of the notification via the communication network 200, in a manner similar to that described above.

In ACT8, the processor 31 notifies the user terminal 1 of the registration completion. When the notification data is sent to the user terminal 1 through the communication network 200 and received by the communication device 16 of the user terminal 1, the processor 11 of the user terminal 1 terminates the processing related to the user registration.

Figure 14:
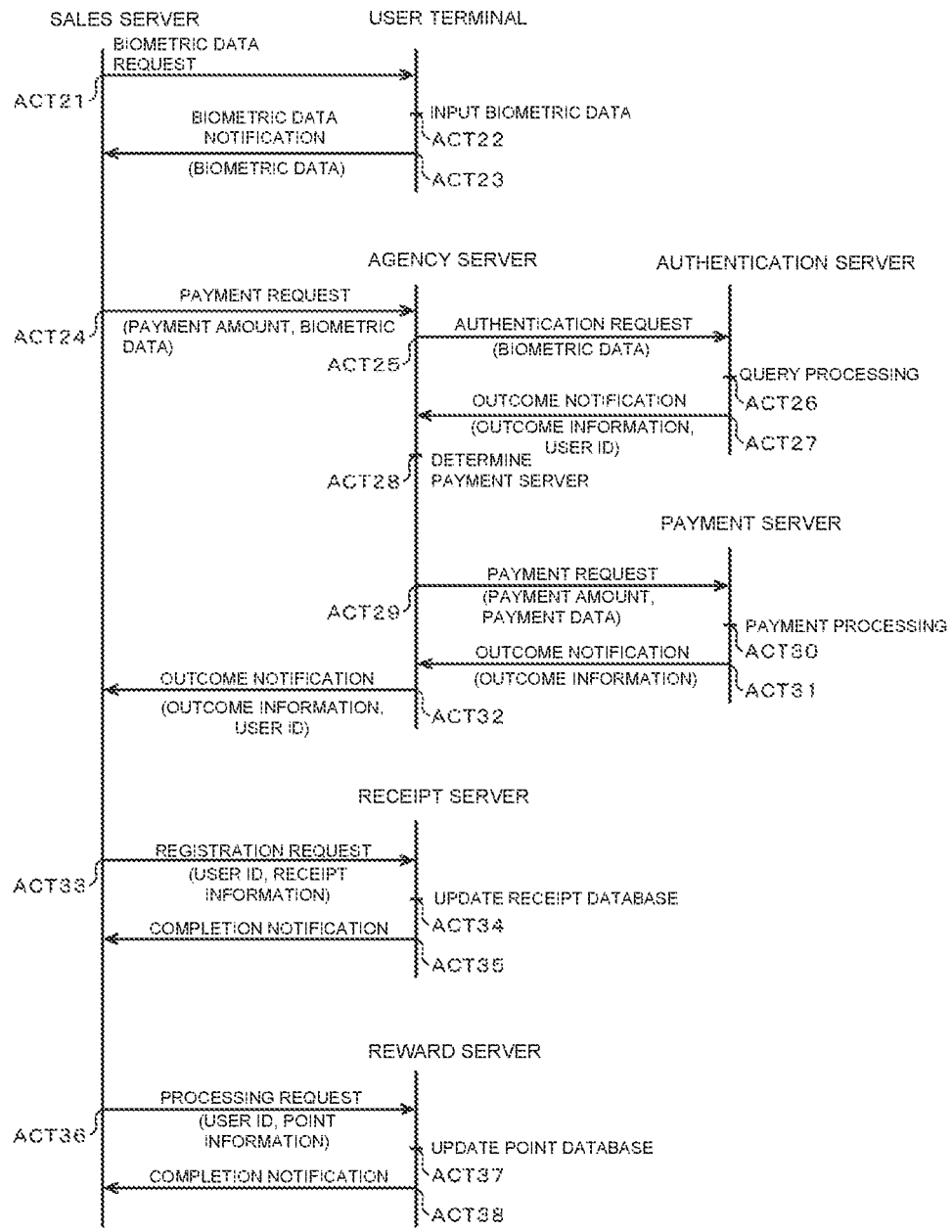
FIG. 14 is a diagram showing a sequence in a case where the transaction processing service is used for payment related to the commodity purchase at a store according to the embodiment.

FIG. 14 is a diagram showing a sequence in a case where the transaction processing service is used for payment related to the purchase of commodities at the store. In a case where the user who has completed the user registration uses the transaction processing service for the payment related to the purchase of commodities at the store, the use of the transaction processing service is declared by an operation of the user or a clerk in a registration device for commodity registration. When receiving this declaration, the processor 21 of the sales server 2 performs a process of ACT21.

In ACT21, the processor 21 of the sales server 2 requests biometric data from the user terminal 1. It should be noted that the processor 21 establishes communication with the user terminal 1 on the basis of connection information obtained by reading a barcode displayed on the touch panel 14 of the user terminal 1 with a scanner, for example, in a registration device such as a POS terminal.

When the processor 11 of the user terminal 1 receives a request for biometric data from the sales server 2, the processor 11 of the user terminal 1 performs a process of ACT22. In ACT22, the processor 11 inputs biometric data. The processor 11 guides the user via the touch panel 14 to input the biometric data, for example. The user performs a task for inputting his/her own biometric data into the input device 15 in accordance with the guide. In this manner, the processor 11 obtains the biometric data in a manner similar to that described above. Thus, the processor 11 acquires the biometric data of the user who is the payer of the transaction. That is, by performing the information processing based on the client app APA by the processor 11, the computer having the processor 11 as the central portion functions as an acquisition means. The user terminal 1 corresponds to a first apparatus including the acquisition means. Next, in ACT23, the processor 11 notifies the sales server 2 of the biometric data. The processor 11 includes, in the notification data to be sent here, the biometric data input in ACT22.

In a case where the commodity registration and calculation of a payment amount have been completed in the registration device, the processing of the processor 21 of the sales server 2 proceeds to ACT24. In ACT24, the processor 21 requests payment from the agency server 3. The processor 21 includes, in the request data to be sent here, the payment amount calculated by the registration device and the biometric data notified in ACT23.

When the processor 31 of the agency server 3 receives the payment request, the processor 31 of the agency server 3 performs a process of ACT25. In ACT25, the processor 31 requests authentication from the authentication server 4. The processor 31 includes, in the request data to be sent here, the biometric data included in the request data sent from the sales server 2 in ACT24.

When the processor 41 of the authentication server 4 receives the authentication request, the processor 41 of the authentication server 4 performs a process of ACT26. In ACT26, the processor 41 performs query processing. That is, for example, the processor 41 checks whether or not the biometric data included in the request data sent from the agency server 3 in ACT25 matches any piece of the biometric data registered in the authentication database DBB. For example, the processor 41 determines that the authentication has succeeded in a case where the matching rate between the characteristics of the biometric data included in the request data sent from the agency server 3 in ACT25 and the biometric data registered in the authentication database DBB is equal to or higher than a predetermined rate, and otherwise determines that the authentication has failed. The processor 41 then selects, for example, the data record DRB including the field FBB in which the biometric data having the highest matching rate has been set, in a case where the authentication has succeeded. The processor 41 acquires, for example, the user ID set in the field FBA of the corresponding data record DRB. It should be noted that the above-mentioned query processing may be other well-known processing for the biometric authentication. The processor 41 thus determines the user ID as an identifier associated with the biometric data. That is, by performing the information processing based on the authentication app APD by the processor 41, the computer having the processor 41 as the central portion functions as a determination means. The authentication server 4 corresponds to a second apparatus including the determination means.

Next, in ACT27, the processor 41 notifies the agency server 3 of the outcome of the authorization. The processor 41 includes, in the notification data to be sent here, outcome information indicating whether or not the authentication has succeeded, and includes, in the notification data to be sent here, the user ID acquired in ACT26 in a case where the authentication has succeeded. It should be noted that the processes after ACT27 in FIG. 14 represent a sequence in a case where the authentication has succeeded, and the description of a case where the authentication has failed will be omitted.

When the processor 31 of the agency server 3 receives the outcome notification indicating that the authentication has succeeded from the authentication server 4, the processor 31 of the agency server 3 performs a process of ACT28. In ACT28, the processor 31 determines the payment server 5 to be used for the payment according to the payment request (see ACT24) from the sales server 2. The processor 31, for example, searches the payment information database DBA for the data record DRA having the field FAA in which the user ID included in the notification data of the outcome notification has been set. The processor 31 determines the payment server 5 corresponding to the payment data set in the field FAB of the corresponding data record DRA as the payment server 5 to be used for the payment.

Next, in ACT29, the processor 31 requests payment from the payment server 5 determined in ACT28. The processor 31 includes, in the request data here, the payment amount included in the request data (see ACT24) sent from the sales server 2 and the payment data used for determining the payment server 5 in ACT28.

In a case where the payment request has been received, the processor 51 of the payment server 5 performs a process of ACT30. In ACT30, the processor 51 performs payment processing for paying the payment amount included in the request data by using the payment data. The processor 51 performs, for example, processing for withdrawing the payment amount from the account associated with the credit number included in the payment data. It should be noted that the payment processing performed by the processor 51 may be similar to processing performed by an existing payment server.

In this way, the processor 51 of the payment server 5 pays for the transaction by using the payment data notified from the agency server 3 in a case where the user ID associated with the biometric data has been determined. By performing information processing based on the payment app APE by the processor 51, the processor 51 functions as a payment means. The payment server 5 corresponds to a third apparatus including the payment means.

Next, in ACT31, the processor 51 of the payment server 5 notifies the agency server 3 of the outcome of the payment processing. The processor 51 includes, in the notification data here, at least outcome information indicating whether or not the payment has been normally completed. In a case where there is information required to be notified in accordance with the payment method, such as a payment number, the processor 51 also includes the corresponding information in the notification data. It should be noted that the processes after ACT31 in FIG. 14 represent a sequence in a case where the payment has been normally completed in ACT30, and the description of a case of payment failure will be omitted.

When the processor 31 of the agency server 3 receives the outcome notification indicating that the payment has been normally completed from the payment server 5, the processor 31 of the agency server 3 performs a process of ACT32. In ACT32, the processor 31 notifies the sales server 2 of the outcome of the payment processing. The processor 31 includes, in the notification data here, the outcome information included in the notification data received from the payment server 5 in ACT31 and the user ID included in the notification data received from the authentication server 4 in ACT27.

When the processor 21 of the sales server 2 receives the outcome notification indicating that the payment has been normally completed from the agency server 3, the processor 21 of the sales server 2 performs a process of ACT33. In ACT33, the processor 21 requests the receipt server 6 to register an electronic receipt. The processor 21 includes, in the request data here, the user ID included in the notification data received from the agency server 3 in ACT32 and the receipt information. The receipt information is information indicating the details of the transaction for which the payment amount notified to the agency server 3 by the processor 31 of the sales server 2 in ACT24 has been calculated. What kind of information the receipt information includes may be arbitrarily determined by, for example, a creator of the sales app APB. The receipt information includes, for example, information for managing the transaction such as the name of the store where the transaction was carried out, the date of transaction, and a receipt number, and information regarding a commodity code, points, and the unit price of each of commodities which have been the transaction targets, a total amount, and the like. That is, it is assumed that the receipt information includes various types of information found in a paper receipt. Moreover, the receipt information may include the payment number included in the notification data sent from the payment server 5 in ACT31. It should be noted that the receipt information may be generated by the registration device. In this case, the processor 21 includes the receipt information acquired from the registration device in the request data.

When the processor 61 of the receipt server 6 receives the registration request, the processor 61 of the receipt server 6 performs a process of ACT34. In ACT34, the processor 61 updates the receipt database DBC. For example, the processor 61 searches the receipt database DBC for the data record DRC having the field FCA the user ID included in the request data received from the sales server 2 in ACT33 has been set. In a case where the corresponding data record DRC is found, the processor 61 adds a new field after the last field of the data record DRC. The processor 61 then sets, in this new field, the receipt information included in the request data received from the sales server 2 in ACT33. In a case where the corresponding data record DRC is not found, the processor 61 adds to the receipt database DBC a new data record DRC having the fields FCA and FCB in which the user ID and the receipt information included in the request data received from the sales server 2 in ACT33 have been set.

Thus, the processor 61 uses the receipt database DBC to manage the receipt information in association with a user identifier associated with the payer's biometric data. Thus, by performing the information processing based on the electronic receipt app APF by the processor 61, the computer having the processor 61 as the central portion functions as a management means. The receipt server 6 corresponds to a fourth apparatus including a management means. Next, in ACT35, the processor 61 notifies the sales server 2 that the receipt registration has been completed.

When the processor 21 of the sales server 2 receives the completion notification indicating that the receipt registration has been completed, the processor 21 of the sales server 2 performs a process of ACT36. It should be noted that in accordance with the outcome notification received in ACT32, the processor 21 may perform the process of ACT36 before and after the registration request as ACT33 without waiting for the completion notification received in ACT35. In ACT36, the processor 21 requests the reward server 7 to perform processing related to the point service. The processor 21 includes, in the request data here, the user ID included in the notification data received from the agency server 3 in ACT32 and the point information. FIG. 14 shows a sequence for realizing a service of adding points given depending on the details of the transaction to the points held by the payer. Therefore, the point information indicates points given depending on the details of the transaction. What kind of point service is provided and what kind of information is included in the point information may be arbitrarily determined by, for example, a creator of the point service app APG or the like. It should be noted that the point information may be generated by the registration device. In this case, the processor 21 includes the point information acquired from the registration device in the request data.

When the processor 71 of the reward server 7 receives the processing request (see ACT36), the processor 71 of the reward server 7 performs a process of ACT37. In ACT37, the processor 71 updates the point database DBD. For example, the processor 71 searches the point database DBD for the data record DRD having the field FDA in which the user ID included in the request data received from the sales server 2 in ACT36 has been set. In a case where the corresponding data record DRD is found, the processor 71 rewrites the held points indicated by the point information set in the field FDB of the data record DRD to points obtained by adding the given points indicated by the point information included in the request data to the held points. Next, in ACT38, the processor 71 notifies the sales server 2 that the point processing has been completed.

As described above, the transaction processing system 100 according to the first embodiment determines the user ID of the payer by biometric authentication using the biometric data of the payer acquired by the user terminal 1, and pays for the transaction and manages the receipt information related to the transaction in association with the user ID in a case where the user ID can be determined. Accordingly, the authentication of the user of the electronic receipt service can also be completed by the biometric authentication of the payer, and the user does not need to additionally perform an operation for inputting the ID for the electronic receipt service. Accordingly, it is possible to reduce the time and effort of the payer in a case where the biometric authentication is used for authenticating the payer of the transaction who uses the electronic receipt service.

Moreover, in accordance with the transaction processing system 100 of the first embodiment, the point information related to the point service is also managed in association with the user ID. Therefore, in a case where the biometric data is properly input, the user can use the point service in addition to the electronic receipt service, and the time and effort of the payer in a case where the biometric authentication is used for authenticating the payer of the transaction who uses the point service can be reduced.

Second Embodiment

Figure 15:
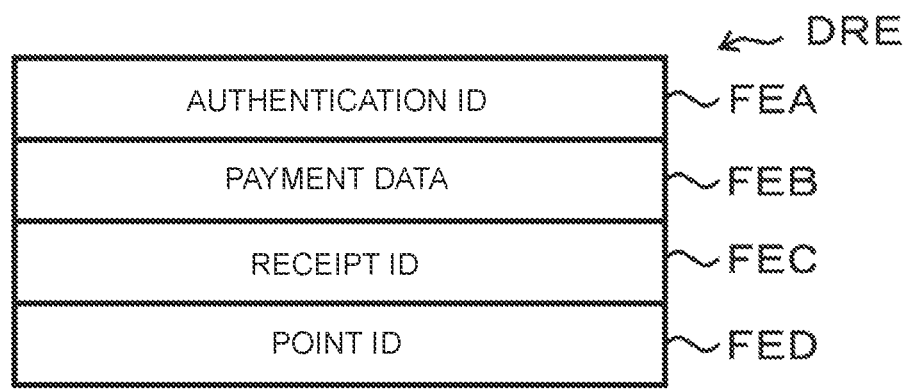
FIG. 15 is a diagram schematically showing a configuration of a data record included in the payment information database of the agency server according to the embodiment.

Since the configuration of the transaction processing system 100 according to the second embodiment is similar to that of the first embodiment, illustration and description thereof will be omitted. Some of the structures of the various databases and the sequences of the second embodiment differs from those of the first embodiment. FIG. 15 is a diagram schematically showing a configuration of the data record DRE included in the payment information database DBA.

In the second embodiment, the payment information database DBA is a set of data records DRE associated with the user of the transaction processing service. The data record DRE includes fields FEA, FEB, FEC, and FDD. An authentication ID, which is an identifier of the user of the transaction processing service, is set in the field FEA. Payment data reported in advance by the user is set in the field FEB. A receipt ID, which is an identifier of the user of the electronic receipt service, is set in the field FEC. A point ID, which is an identifier of the user of the point service, is set in the field FED. It should be noted that the data record DRE may include another field and arbitrary information may be set in the field.

Figure 16:
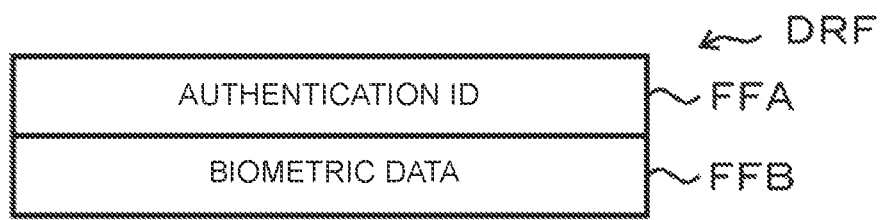
FIG. 16 is a diagram schematically showing a configuration of a data record including the authentication database of the authentication server according to the embodiment.

FIG. 16 is a diagram schematically showing a configuration of a data record DRF included in the authentication database DBB. In a second embodiment, the authentication database DBB is a set of data records DRF associated with the user of the transaction processing service. The data record DRF includes fields FFA and FFB. The authentication ID is set in the field FFA. The biometric data of the user is set in the field FFB. It should be noted that the data record DRF may include another field and arbitrary information may be set in the field.

Figure 17:
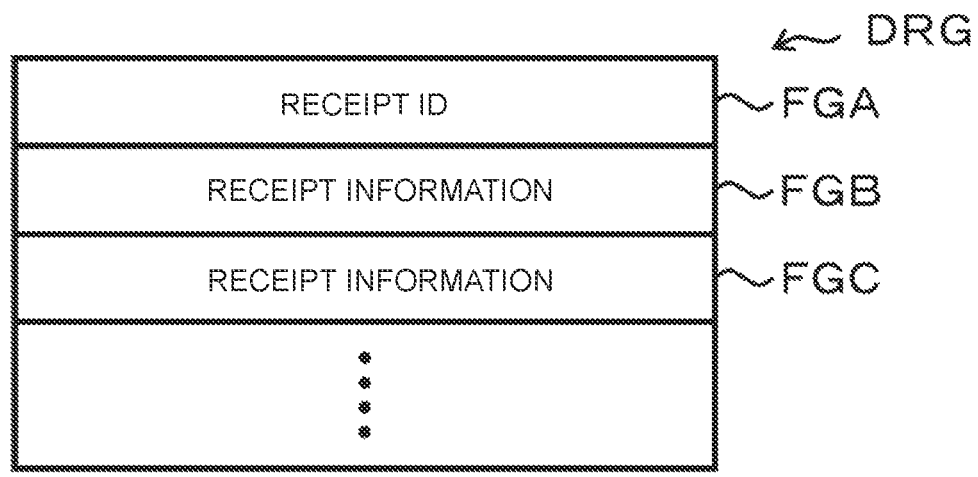
FIG. 17 is a diagram schematically showing a configuration of a data record included in the receipt database of the receipt server according to the embodiment.

FIG. 17 is a diagram schematically showing a configuration of a data record DRG included in the receipt database DBC. In the second embodiment, the receipt database DB is a set of data records DRG associated with the user of the electronic receipt service. The data record DRG includes fields FGA and FGB. Moreover, the data record DRG may also include fields after the field FGC. The receipt ID is set in the field FGA. Receipt information regarding one transaction is set in the field FGB. In a case where a plurality of pieces of receipt information has been registered, related to the user identified by the receipt ID set in the field FGA, the receipt information for the second and subsequent transactions is set in each field after the field FGC. It should be noted that the data record DRG may include another field and arbitrary information may be set in the field.

Figure 18:
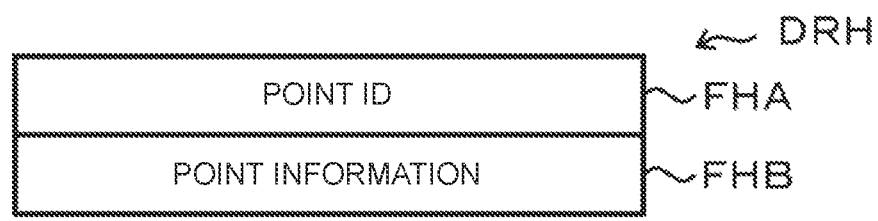
FIG. 18 is a diagram schematically showing a configuration of a data record included in the points database of the reward server according to the embodiment.

FIG. 18 is a diagram schematically showing a configuration of a data record DRH included in the point database DBD. In the second embodiment, the point database DBD is a set of data records DRH associated with the user of the point service. The data record DRH includes fields FHA and FHB. A point ID is set in the field FHA. Point information is set in the field FHB. It should be noted that the data record DRH may include another field and arbitrary information may be set in the field.

Next, an operation of the transaction processing system 100 of the second embodiment configured as described above will be described. The authentication ID in the second embodiment is substantially the same as the user ID in the first embodiment. Therefore, the sequence related to the user registration of the transaction processing service is substantially similar to that of the first embodiment. It should be noted that in ACT4 in FIG. 13, the processor 31 of the agency server 3 sets, for example, the determined authentication ID (see ACT3) and the payment data included in the request data in the fields FEA and FEB, respectively, and adds a new data record DRE in which predetermined invalid values have been set in the fields FEC and FED to the payment information database DBA. It should be noted that the processor 31 may leave the fields FEC and FED blank, or does not need to include the fields FEC and FED in the new data record DRE.

Moreover, in the registration request in ACT5 and the completion notification in ACT7, the authentication ID is included in the request data and the notification data instead of the user ID. In ACT6, the processor 41 of the authentication server 4 adds a new data record DRF having the fields FFA and FFB in which the authentication ID included in the request data and the biometric data have been set, for example, to the authentication database DBB.

Figure 19:
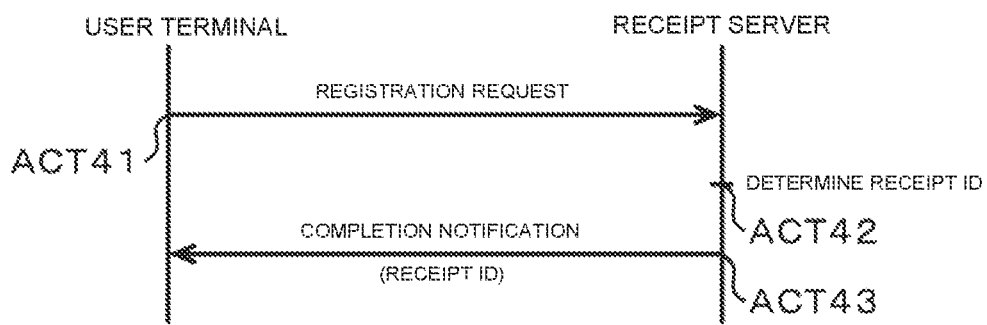
FIG. 19 is a diagram showing a sequence related to the user registration of the electronic receipt service according to the embodiment.

FIG. 19 is a diagram showing a sequence related to user registration of the electronic receipt service. In order to start the use of the electronic receipt service, the user instructs the user terminal 1 whose processor 11 is performing the information processing based on the client app APA to perform the user registration related to the electronic receipt service. In response to this instruction, the processor 11 performs a process of ACT41 with the user terminal 1. In ACT41, the processor 11 requests the receipt server 6 to perform the registration.

When the processor 61 of the receipt server 6 receives the registration request, the processor 61 of the receipt server 6 performs a process of ACT42. In ACT42, the processor 61 determines the receipt ID associated with the user such that the receipt ID is not coincident a receipt ID already associated with another user. For example, the processor 61 uses a character string determined in accordance with a predetermined algorithm as the receipt ID such that the character string can be determined with no duplicates. Alternatively, the processor 61 stores, for example, list data indicating a list of receipt IDs determined in the past in the auxiliary storage device 63 and determines a receipt ID not included in the list as a new receipt ID. Alternatively, the processor 61 may determine, for example, a receipt ID that is not set in the field FGA of the data record DRG included in the receipt database DBC as a new receipt ID and add a new data record DRG having the field FGA in which the receipt ID determined here has been set to the receipt database DBC. The processor 61 may determine the receipt ID by any other method.

Next, in ACT43, the processor 61 notifies the user terminal 1 of the registration completion. The processor 61 includes the determined receipt ID in the notification data at this time. When the processor 11 of the user terminal 1 receives the notification of registration completion, the processor 11 of the user terminal 1 stores, in the auxiliary storage device 13, the receipt ID included in the notification data.

Figure 20:
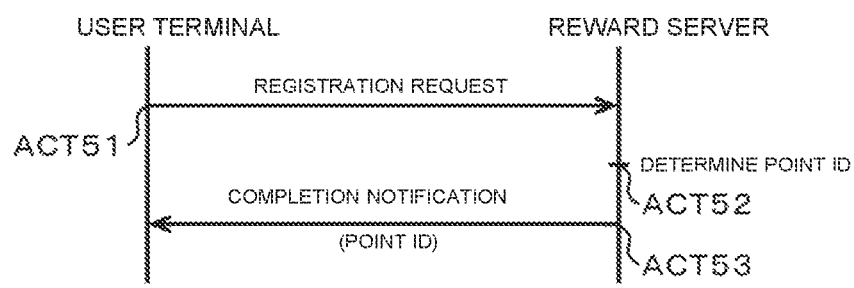
FIG. 20 is a diagram showing a sequence related to the user registration of the points service according to the embodiment.

FIG. 20 is a diagram showing a sequence related to user registration of the point service. In order to start the use of the point service, the user instructs the user terminal 1 whose processor 11 is performing the information processing based on the client app APA to register the user related to the point service. In response to this instruction, the processor 11 of the user terminal 1 performs a process of ACT51. In ACT51, the processor 11 requests the reward server 7 to perform the registration.

When the processor 71 of the reward server 7 receives the registration request, the processor 71 of the reward server 7 performs a process of ACT52. In ACT52, the processor 71 determines the point ID associated with the user such that the point ID is not coincident with a point ID already associated with another user. For example, the processor 71 uses a character string determined in accordance with a predetermined algorithm as the point ID such that the character string can be determined with no duplicates. Alternatively, the processor 71 stores, for example, list data indicating a list of point IDs determined in the past in the auxiliary storage device 73 and determines a receipt ID not included in the list as a new receipt ID. Alternatively, the processor 71 determines, for example, a point ID that is not set in the field FHA of the data record DRH included in the point database DBD as a new point ID, and adds a new data record DRH having the field FHA in which the point ID determined here has been set to the receipt database DBC. The processor 71 may determine the point ID by any other method.

Next, in ACT53, the processor 71 notifies the user terminal 1 of the registration completion. The processor 71 includes the determined point ID in the notification data at this time. When the processor 11 of the user terminal 1 receives the notification of registration completion, the processor 11 of the user terminal 1 stores, in the auxiliary storage device 13, the point ID included in the notification data.

Figure 21:
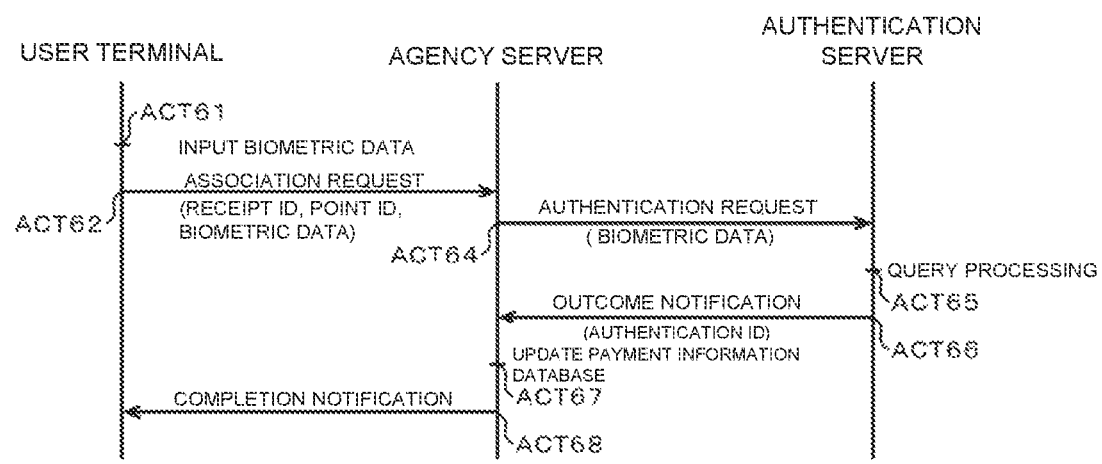
FIG. 21 is a diagram showing a sequence related to association of IDs according to the embodiment.

FIG. 21 is a diagram showing a sequence related to association of IDs. After the user finishes the user registration of the transaction processing service and the user registration of at least one of the electronic receipt service or the point service, the user instructs the user terminal 1 in which the processor 11 is performing the information processing based on the client app APA to associate the ID. In response to this instruction, the processor 11 of the user terminal 1 performs a process of ACT61. In ACT61, the processor 11 inputs biometric data. The processor 11 guides the user via the touch panel 14 to input the biometric data, for example. The user performs a task for inputting his/her own biometric data into the input device 15 in accordance with the guide. In this manner, the processor 11 obtains the biometric data in a manner similar to that described above.

In ACT62, the processor 11 requests the agency server 3 to perform the association. The processor 11 includes, in the request data here, the receipt ID in a case where the receipt ID is stored in the auxiliary storage device 13. The processor 11 includes, in the request data here, the point ID in a case where the point ID is stored in the auxiliary storage device 13. Moreover, the processor 11 includes, in the request data here, the biometric data input in ACT61.

When the processor 31 of the agency server 3 receives the association request from the processor 11, the processor 31 of the agency server 3 performs a process of ACT64. In ACT64, the processor 31 requests the authentication server 4 to perform the authentication. The processor 31 includes, in the request data to be sent here, the biometric data included in the request data sent from the user terminal 1 in ACT62.

When the processor 41 of the authentication server 4 receives the authentication request from the agency server 3, the processor 41 of the authentication server 4 performs a process of ACT65. In ACT65, the processor 41 performs query processing. That is, for example, the processor 41 checks whether or not the biometric data included in the request data sent from the agency server 3 in ACT64 matches any piece of the biometric data registered in the authentication database DBB. For example, the processor 41 determines that the authentication has succeeded in a case where the matching rate between the characteristics of the biometric data included in the request data sent from the agency server 3 in ACT64 and any piece of the biometric data registered in the authentication database DBB is equal to or higher than a predetermined rate, and otherwise determines that the authentication has failed. The processor 41 then selects, for example, the data record DRF including the field FFB in which the biometric data having the highest matching rate has been set, in a case where the authentication has succeeded. The processor 41 acquires, for example, the authentication ID set in the field FFA of the corresponding data record DRF.

Next, in ACT66, the processor 41 notifies the agency server 3 of the outcome of the authorization. The processor 41 includes, in the notification data to be sent here, outcome information indicating whether or not the authentication has succeeded, and includes, in the notification data to be sent here, the authentication ID acquired in ACT65 in a case where the authentication has succeeded. It should be noted that the processes after ACT66 in FIG. 21 represent a sequence in a case where the authentication has succeeded, and the description of a case where the authentication has failed will be omitted.

When the processor 31 of the agency server 3 receives the outcome notification indicating that the authentication has succeeded from the authentication server 4, the processor 31 of the agency server 3 performs a process of ACT67. In ACT67, the processor 31 updates the payment information database DBA. For example, the processor 31 searches the payment information database DBA for the data record DRE having the field FEA in which the authentication ID included in the notification data sent from the authentication server 4 in ACT67 has been set. In a case where the request data sent from the user terminal 1 in ACT62 includes a receipt ID, the processor 31 sets the receipt ID in the field FEC of the corresponding data record DRE. Moreover, in a case where the request data sent from the user terminal 1 in ACT62 includes a point ID, the processor 31 sets the point ID in the field FED of the corresponding data record DRE. Next, in ACT68, the processor 31 notifies the user terminal 1 of the association completion.

Figure 22:
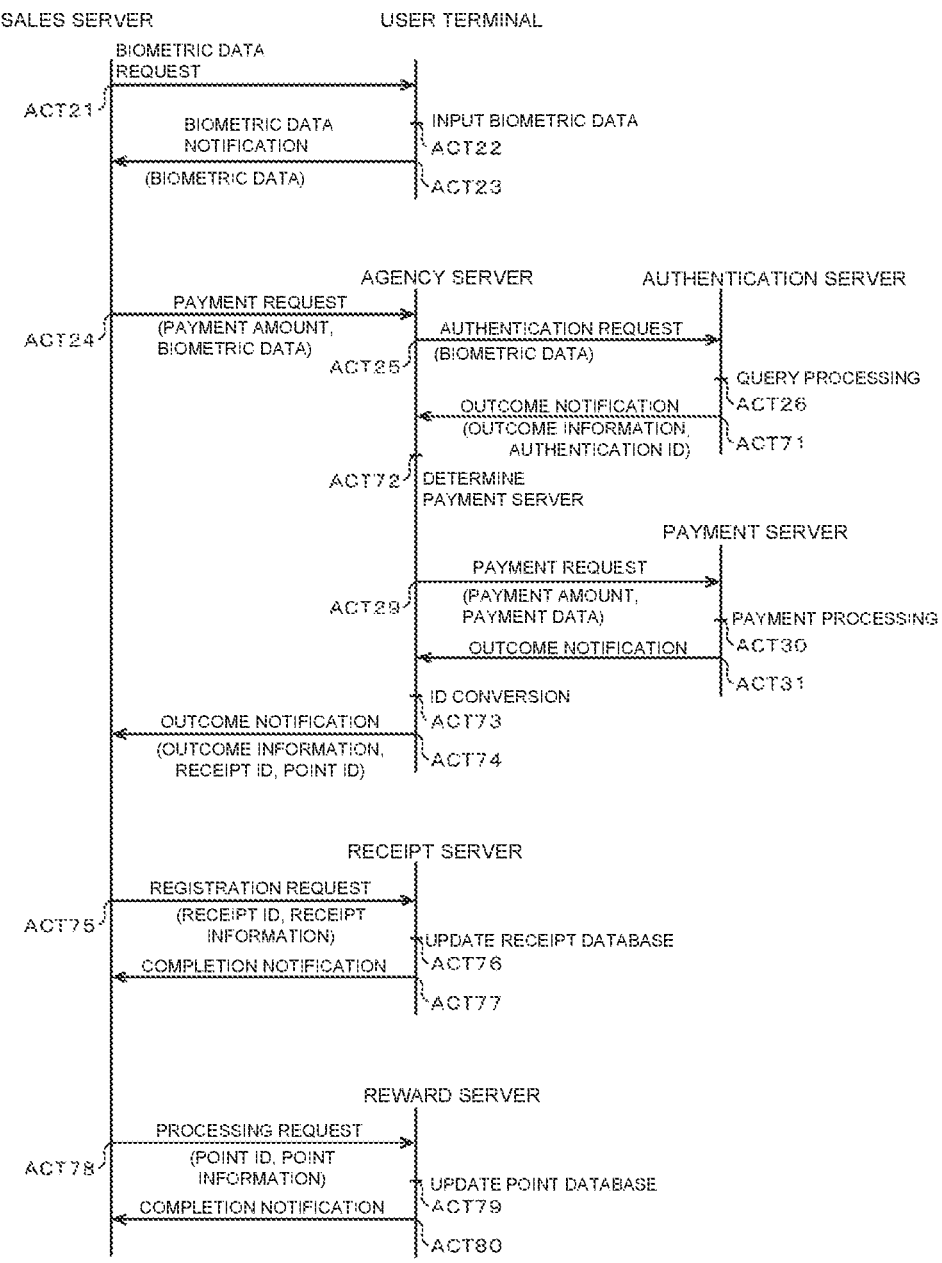
FIG. 22 is a diagram showing a sequence in a case where the transaction processing service is used for payment related to the commodity purchase at the store according to the embodiment.

FIG. 22 is a diagram showing a sequence in the case where the transaction processing service is used for payment related to the purchase of commodities at the store. It should be noted that the same operations as those in FIG. 14 will be denoted by the same reference signs and descriptions thereof will be omitted. The processes from ACT21 to ACT26 are similar to those of the first embodiment shown in FIG. 14. It should be noted that in a case where the authentication has succeeded in ACT26, the processor 41 acquires the authentication ID set in the field FGA of the data record DRF including the field FFB in which the biometric data having the highest matching rate has been set. When the processor 41 has finished the process of ACT26, the processor 41 performs a process of ACT71. Thus, the processor 41 determines the authentication ID as a first identifier associated with the biometric data. That is, by performing the information processing based on the authentication app APD by the processor 41, the computer having the processor 41 as the central portion functions as a determination means.

Next, in ACT71, the processor 41 notifies the agency server 3 of the outcome of the authorization. The processor 41 includes, in the notification data to be sent here, outcome information indicating whether or not the authentication has succeeded, and includes, in the notification data to be sent here, the authentication ID acquired in ACT26 in a case where the authentication has succeeded. It should be noted that the processes after ACT71 in FIG. 22 represent a sequence in a case where the authentication has succeeded, and the description of a case where the authentication has failed will be omitted.

When the processor 31 of the agency server 3 receives the outcome notification indicating that the authentication has succeeded from the authentication server 4, the processor 31 of the agency server 3 performs a process of ACT72. In ACT72, the processor 31 determines the payment server 5 for payment according to the payment request (see ACT24) from the sales server 2. For example, the processor 31 searches the payment information database DBA for a data record DRE having the field FEA in which the authentication ID included in the notification data of the outcome notification has been set. The processor 31 determines the payment server 5 corresponding to the payment data set in the field FEB of the corresponding data record DRE as the payment server 5 to be used for the payment.

The subsequent processes ACT29, ACT30, and ACT31 are similar to those of the first embodiment. Therefore, in a case where the authentication ID associated with the biometric data is determined, the processor 51 pays for the transaction by using the payment data notified from the agency server 3. That is, by performing information processing based on the payment app APE by the processor 51, the processor 51 functions as a payment means.

When the processor 31 of the agency server 3 receives the outcome notification indicating that the payment has been normally completed from the payment server 5, the processor 31 of the agency server 3 performs a process of ACT73. In ACT73, the processor 31 performs ID conversion on the authentication ID included in the notification data sent from the authentication server 4. For example, in a case where the receipt ID has been set in the field FEC of the data record DRE found in ACT72, the processor 31 sets the receipt ID as the converted ID. Moreover, for example, in a case where the point ID has been set in the field FED of the data record DRE found in ACT72, the processor 31 sets the point ID as the converted ID. Thus, the processor 31 converts the authentication ID as the first identifier into a receipt ID as a second identifier. That is, by performing information processing based on the agency app APC by the processor 31, the computer having the processor 31 as the central portion functions as a conversion means. The agency server 3 corresponds to a fifth apparatus including the conversion means.

In ACT74, the processor 31 notifies the sales server 2 of the outcome of the payment processing. The processor 31 includes, in the notification data here, the outcome information included in the notification data received from the payment server 5 in ACT31 and the ID after ID conversion in ACT73. That is, the processor 31 includes the receipt ID in the notification data in a case where the receipt ID is obtained as the converted ID in ACT73. Moreover, the processor 31 includes the point ID in the notification data in a case where the point ID is obtained as the converted ID in ACT73. Although the notification data in ACT74 is shown including the receipt ID and the point ID in FIG. 22, the notification data sometimes includes only one of the receipt ID and the point ID or sometimes does not include any of the receipt ID and the point ID.

The processor 21 of the sales server 2 receives the outcome notification indicating that the payment has been normally completed from the agency server 3 and performs a process of ACT75 in a case where the notification data includes the receipt ID. In ACT75, the processor 21 requests the receipt server 6 to register an electronic receipt. The processor 21 includes, in the request data here, the receipt ID included in the notification data received from the agency server 3 in ACT74 and the receipt information.

When the processor 61 of the receipt server 6 receives the registration request from the sales server 2, the processor 61 of the receipt server 6 performs a process of ACT76. In ACT76, the processor 61 updates the receipt database DBC. For example, the processor 61 searches the receipt database DBC for a data record DRG having the field FGA in which the receipt ID included in the request data received from the sales server 2 in ACT75 has been set. In a case where the corresponding data record DRG is found, the processor 61 adds a new field after the last field of the data record DRG. The processor 61 then sets, in this new field, the receipt information included in the request data received from the sales server 2 in ACT75. In a case where the corresponding data record DRG is not found, the processor 61 adds to the receipt database DBC a new data record DRG having the fields FGA and FGB in which the receipt ID and the receipt information included in the request data received from the sales server 2 in ACT75 have been set.

Thus, the processor 61 uses the receipt database DBC to manage the receipt information in association with a receipt identifier associated with the payer's biometric data. Thus, by performing the information processing based on the electronic receipt app APF by the processor 61, the computer having the processor 61 as the central portion functions as a management means. Next, in ACT77, the processor 61 notifies the sales server 2 that the receipt registration has been completed.

The processor 21 of the sales server 2 receives the above-mentioned outcome notification (see ACT74) indicating that the payment has been normally completed from the agency server 3, and performs a process of ACT78 in a case where the point ID is included in the notification data. In ACT78, the processor 21 requests the reward server 7 to perform processing related to the point service. The processor 21 includes, in the request data here, the point ID included in the notification data received from the agency server 3 in ACT74 and the point information.

When the processor 71 of the reward server 7 receives the processing request from the sales server 2, the processor 71 of the reward server 7 performs a process of ACT79. In ACT79, the processor 71 updates the point database DBD. For example, the processor 71 searches the point database DBD for a data record DRH having the field FHA in which the point ID included in the request data received from the sales server 2 in ACT78 has been set. In a case where the corresponding data record DRH is found, the processor 71 rewrites the held points indicated by the point information set in the field FHB of the data record DRH to points obtained by adding the given points indicated by the point information included in the request data to the held points. Accordingly, a reward is given to the user identified by the user ID in the form of giving points depending on the transaction. Thus, by performing the information processing based on the point service app APG by the processor 71, the computer having the processor 71 as the central portion functions as a giving means. Next, in ACT80, the processor 71 notifies the sales server 2 that the point processing has been completed.

It should be noted that FIG. 22 shows an example in which the receipt ID and the point ID are included in the notification data received from the agency server 3 in ACT74. In a case where the receipt ID is not included in the notification data received from the agency server 3 in ACT74, ACT75, ACT76, and ACT77 are not performed. Moreover, in a case where the notification data received from the agency server 3 in ACT74 does not include the point ID, the processes of ACT78, ACT77, and ACT78 are not performed. Moreover, the processor 21 may also perform the process of ACT78 prior to the process of ACT75. Alternatively, the processor 21 may perform the process of ACT78 after the process of ACT75 and before the process of ACT77.

As described above, the transaction processing system 100 of the second embodiment determines the authentication ID of the payer by biometric authentication using the biometric data of the payer acquired by the user terminal 1, and pays for the transaction and manages the receipt information related to the transaction in association with the receipt ID associated with the authentication ID in a case where the authentication ID can be determined. Therefore, the authentication of the user of the electronic receipt service can be completed by the biometric authentication of the payer and the user does not need to additionally perform an operation for inputting the ID for the electronic receipt service. Accordingly, it is possible to reduce the time and effort of the payer in a case where the biometric authentication is used for authenticating the payer of the transaction who uses the electronic receipt service.

Moreover, the transaction processing system 100 according to the second embodiment manages the point information related to the point service in association with the point ID associated with the authentication ID. Therefore, in a case where the biometric data is properly input, the user can use the point service in addition to the electronic receipt service, and the time and effort of the payer in a case where the biometric authentication is used for authenticating the payer of the transaction who uses the point service can be reduced.

Various modifications of the above-mentioned embodiments can be made as follows. The determination of the user ID or the authentication ID associated with the biometric data may be performed by the agency server 3. Moreover, the determination of the user ID or the authentication ID associated with the biometric data may be performed by the payment server by directly requesting the payment from the sales server 2 to the payment server 5. Alternatively, the receipt server 6 or the reward server 7 has a function as a determination means and may be substituted as the authentication server 4.

A server other than the server included in the receipt server 6 or the reward server 7 or the transaction processing system 100 may function as a conversion means and the other server may be used as the authentication server 4.

The transaction processing system 100 does not need to perform the sequence shown in FIG. 19. In the sequence shown in FIG. 21, the user terminal 1 may additionally input a receipt ID determined by an arbitrary method.

The transaction processing system 100 does not need to perform the sequence shown in FIG. 20. The user terminal 1 may input a separately registered point ID. In the sequence shown in FIG. 21, the user terminal 1 may additionally input a point ID determined by an arbitrary method.

The biometric data may be input using an input device built in or externally attached to a registration device such as a POS terminal connected to the sales server 2.

The transaction processing system 100 does not need to provide the point service.

Each function realized by the processor 11, 21, 31, 41, 51, 61, or 71 in the information processing can be realized by hardware that performs information processing not based on a program, like a logic circuit or the like. Alternatively, each of the above-mentioned functions may be realized by combining software control with the hardware such as the logic circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transaction processing system that provides a transaction processing service to a user, comprising:
   a user terminal that inputs biometric data of a user who performs payment of a transaction as a target of the transaction processing service;
   an agency server that:
     receives the biometric data of the user input by the user terminal,
     assigns a user identifier of the user based on the received biometric data, and
     registers, in a payment information database stored therein, a first data record in which the user identifier is associated with payment data, the first data record in the payment information database being searchable by the user identifier;
   an authentication server that:
     receives the user identifier and the biometric data of the user from the agency server, and
     registers, in an authentication database stored therein, a second data record in which the user identifier is associated with the biometric data, the second data record in the authentication database being searchable by the user identifier;

one or more end-point sales servers, each of which:
receives the biometric data of the user input by the user terminal, and
transmits, to the agency server, a payment request along with the received biometric data, and causes the agency server to forward the biometric data received along with the payment request to the authentication server, such that the authentication server, upon receiving the biometric data of the user after the registration in the authentication database, authenticates the biometric data by searching the authentication database, and acquires the user identifier from the second data record and transmits the acquired user identifier to the agency server in a case where the authentication has succeeded, wherein the authentication server transmits the payment data associated with the acquired user identifier in the first data record of the payment information database for payment;
a payment server that:
receives, from the agency server, the payment data associated with the acquired user identifier in the first data record of the payment information database, and
performs payment processing for the transaction by using the received payment data and transmits a payment result and the acquired user identifier to the end-point sales server via the agency server; and
a receipt server that:
receives, from the end-point sales server, the user identifier and receipt information of the transaction that is generated based on the payment result, and
registers, in a receipt database stored therein, a third data record in which the user identifier is associated with the receipt information, the third data record in the receipt database being searchable by the user identifier.

2. The transaction processing system according to claim 1, further comprising:
a reward server that:
receives, from the end-point sales server, the user identifier and reward information for the transaction that is generated based on the payment result, and
registers, in a reward database stored therein, a fourth data record in which the user identifier is associated with the reward information, the fourth data record in reward database being searchable by the user identifier.

3. A transaction processing system that provides a transaction processing service to a user, comprising:
a user terminal that inputs biometric data of a user who performs payment of a transaction as a target of the transaction processing service;
an agency server that:
receives the biometric data of the user input by the user terminal,
assigns a first user identifier of the user based on the received biometric data, and
registers, in a payment information database stored therein, a first data record in which the first user identifier is associated with payment data and a second user identifier of the user for electronic receipt service, the first data record in the payment information database being searchable by the first user identifier;
an authentication server that:
receives the first user identifier and the biometric data of the user from the agency server, registers, in an authentication database stored therein, a second data record in which the first user identifier is associated with the biometric data, the second data record in the authentication database being searchable by the first user identifier;
one or more end-point sales servers, each of which:
receives the biometric data of the user input by the user terminal, and
transmits, to the agency server, a payment request along with the received biometric data, and causes the agency server to forward the biometric data received along with the payment request to the authentication server, such that the authentication server, upon receiving the biometric data of the user after the registration in the authentication database, authenticates the biometric data by searching the authentication database, and acquires the first user identifier from the second data record and transmits the acquired first user identifier to the agency server in a case where the authentication has succeeded, wherein the authentication server transmits the payment data associated with the acquired first user identifier in the first data record of the payment information database for payment;
a payment server that:
receives, from the agency server, the payment data associated with the acquired first user identifier in the first data record of the payment information database, and
performs payment processing for the transaction by using the received payment data and transmits a payment result to the agency server, wherein the agency server transmits the payment result and the second user identifier associated with the acquired first user identifier in the first data record of the payment information database to the end-point sales server; and
a receipt server that:
receives, from the end-point sales server, the second user identifier associated with the first user identifier in the first data record of the payment information database, and receipt information of the transaction that is generated based on the payment result, and
registers, in a receipt database stored therein, a third data record in which the second user identifier is associated with the receipt information, the third data record in the receipt database being searchable by the second user identifier.

4. The transaction processing system according to claim 3, wherein
a third user identifier for reward service is also associated with the first user identifier in the first data record of the payment information database, and
the transaction processing system further comprises a reward server that:
receives, from the end-point sales server, the third user identifier associated with the first user identifier in the first data record of the payment information database, and reward information for the transaction that is generated based on the payment result, and
registers, in a reward database stored therein, a fourth data record in which the third user identifier is associated with the reward information, the fourth data record in the reward database being searchable by the third user identifier.

5. The transaction processing system according to claim 4, wherein the agency server, based on the first user identifier received from the authentication server after the authentication, obtains each of the second user identifier and the third user identifier from the first data record of the payment information database.

* * * * *